US009535955B1

(12) United States Patent
Dotan et al.

(10) Patent No.: US 9,535,955 B1
(45) Date of Patent: Jan. 3, 2017

(54) MODIFYING QUERIES AND RULES FOR PROFILE FETCHING AND RISK CALCULATION

(71) Applicant: EMC Corporation, Hopkinton, MA (US)

(72) Inventors: Yedidya Dotan, Newton, MA (US); Oded Peer, Ranana (IL); Oleg Freylafert, Hod Hasharon (IL); Asaf Shoval, Rishon Le-Zion (IL); Eyal Lewinsohn, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 72 days.

(21) Appl. No.: 13/796,421

(22) Filed: Mar. 12, 2013

(51) Int. Cl.
*G06F 17/30* (2006.01)
*G06F 7/00* (2006.01)

(52) U.S. Cl.
CPC ................. *G06F 17/30469* (2013.01)

(58) Field of Classification Search
CPC ............. G06F 17/30448; G06F 17/30477; G06F 17/30424
See application file for complete search history.

(56) References Cited

U.S. PATENT DOCUMENTS

| 7,707,201 | B2 * | 4/2010 | Kapur | G06F 17/3087 707/706 |
| 7,860,875 | B2 * | 12/2010 | Bird | G06F 17/30448 707/759 |
| 8,370,389 | B1 | 2/2013 | Dotan | |
| 2005/0097320 | A1 * | 5/2005 | Golan | G06F 21/40 713/166 |
| 2009/0276257 | A1 * | 11/2009 | Draper | B25J 9/042 705/7.28 |
| 2011/0247069 | A1 * | 10/2011 | Slater | G06F 21/577 726/22 |
| 2013/0097709 | A1 * | 4/2013 | Basavapatna | G06F 21/552 726/25 |

OTHER PUBLICATIONS

Rete Algorithm. Wikipedia. http://en.wikipedia.org/wiki/Rete_algorithm accessed Mar. 4, 2013.
(Continued)

*Primary Examiner* — Sangwoo Ahn
(74) *Attorney, Agent, or Firm* — Ryan, Mason & Lewis, LLP (57) ABSTRACT

Methods, apparatus and articles of manufacture for modifying queries and rules for profile fetching and risk calculation are provided herein. A method includes comparing at least one aspect of a query submitted to access a data store to rule sets associated with the data store to determine a potential access path within the data store for responding to the query, comparing information pertaining to an entity identified via the query to risk information pertaining to entities to determine a level of risk associated with the entity identified via the query, generating a modified version of the query based on information derived from the potential access path within the data store for responding to the query, and calculating a risk score associated with the modified version of the query based on the aspect of the query and the level of risk associated with the entity identified via the query.

19 Claims, 5 Drawing Sheets

(56) References Cited

OTHER PUBLICATIONS

The Oracle Alchemist. Rewrite a Query at Runtime. http://www.oraclealchemist.com/news/trick-2-rewrite-a-query-at-runtime/ Sep. 20, 2006.
Introduction to the Oracle Database. http://docs.oracle.com/cd/B19306_01/server.102/b14220/intro.htm#sthref35 accessed Mar. 10, 2013.

* cited by examiner

MODIFYING QUERIES AND RULES FOR PROFILE FETCHING AND RISK CALCULATION

FIELD

The field relates generally to authentication techniques, and more particularly to risk calculations for query submissions.

BACKGROUND

In typical query submission environments, components such as analytical engines commonly maintain profiles of entities and relevant internal facts (such as, for example, a geographic location associated with a certain internet protocol (IP) address). However, fetching data in response to queries in such environments has become increasingly challenging due to the ever-increasing volume of data and a multitude of unique deployment aspects of systems implemented within such environments.

Existing approaches include using database (DB) tuning processes which cause a debate every time a new fact is added to the system. However, such approaches require re-tuning for every database type, and troubleshooting operations can become challenging as a developer may not know what query was actually run against a DB. Accordingly, a need exists for techniques to efficiently re-write user queries so as to render the queries targeted without limiting the amount of related (or potentially related) information returned upon execution of the queries.

SUMMARY

One or more illustrative embodiments of the present invention provide modifying queries and rules for profile fetching and risk calculation.

In accordance with an aspect of the invention, a method is provided comprising the steps of comparing at least one aspect of a query submitted to access a data store to one or more rule sets associated with the data store to determine at least one potential access path within the data store for responding to the query; comparing information pertaining to an entity identified via the query to risk information pertaining to one or more entities to determine a level of risk associated with the entity identified via the query; generating a modified version of the query based on information derived from the at least one potential access path within the data store for responding to the query; and calculating a risk score associated with the modified version of the query based on the at least one aspect of the query and the level of risk associated with the entity identified via the query.

In accordance with another aspect of the invention, a method is provided comprising the steps of: generating one or more rule sets associated with a data store; receiving a query to access the data store, wherein said query includes information derived from the one or more rule sets associated with the data store; receiving a risk score associated with the query, wherein said risk score is based on at least one aspect of the query and a level of risk associated with an entity identified via the query; and executing at least one policy operation pertaining to processing of the query, wherein said at least one policy operation is based on the risk score associated with the query.

The risk calculation techniques of the illustrative embodiments overcome one or more of the problems associated with the conventional techniques described previously, and provide techniques to re-format Rete-based rules to trim relevant data and auto-generated queries based on a super query. These and other features and advantages of the present invention will become more readily apparent from the accompanying drawings and the following detailed description.

DETAILED DESCRIPTION

As will be described, the present invention, in one or more illustrative embodiments, provides techniques for using the Rete algorithm to perform structured query language (SQL) and rule rewrites for profile fetching and risk calculation. At least one embodiment of the invention includes implementing a naïve rule-based method on a rule-based system for receiving and executing user queries. Additionally, at least one embodiment of the invention includes re-formatting Rete-based rules to trim query response data. Further, such an embodiment of the invention includes auto-generating queries based on a super query that is a re-written form of an original query based on determinations made in connection with obtained facts and entity profiles, as further described herein.

Illustrative embodiments of the present invention will be described herein with reference to exemplary communication systems and associated processing devices. It is to be appreciated, however, that the invention is not restricted to use with the particular illustrative system and device configurations shown. Accordingly, the term "communication system" of "processing device," as used herein, is intended to be broadly construed so as to encompass any type of system in which multiple processing devices can communicate with one another (such as a computer, server, mobile telephone, radio-frequency identification (RFID) tag or reader, etc.).

Figure 1:
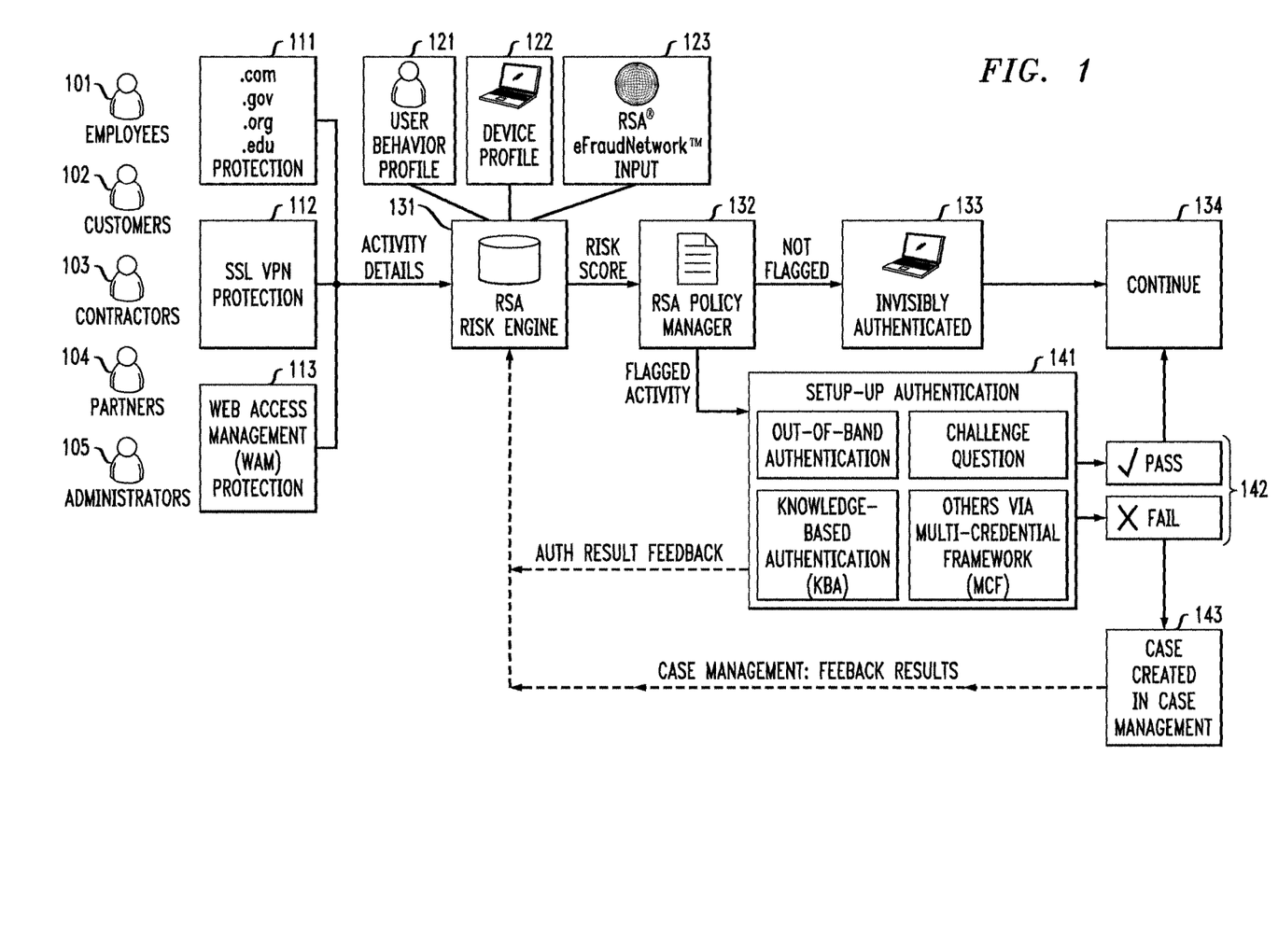
FIG. 1 is a diagram illustrating components of an example embodiment of the present invention.

FIG. 1 is a diagram illustrating an example embodiment of the present invention. By way of illustration, FIG. 1 depicts a user such as employees 101, customers 102, contractors 103, partners 104 and/or administrators 105 submitting a query via means of protection such as .com, .gov, .org, and .edu protection 111, secure sockets layer virtual private network (SSL VPN) protection 112, and web access management (WAM) protection 113. Activity details from the user are provided to a risk engine 131, along with one or more user behavior profiles 121, one or more device profiles 122, and risk information input 123 (such as from RSA® eFraudNetwork™). The risk engine 131, based on these inputs, generates a risk score associated with the submitted query and provides the risk score to a policy manager 132.

The policy engine 132 analyzes the risk score to make one or more policy determinations regarding the processing of the query (based, for example, on internal rules and/or policies). If, upon such analysis, the policy engine 132 determines that no flagged activity (for example, potentially troubling activity, activity associated with a fraud scenario) is present in the query, the query is invisibly authenticated in step 133 and the processing of the query continues in step 134.

If, upon such analysis, the policy engine 132 determines that the query does include flagged activity, one or more authentication measures 141 can be summoned or raised prior to continuing with the processing of the query. Such authentication measures might include, for example, out-of-band authentication, one or more challenge questions, knowledge-based authentication (KBA), authentication via multi-credential framework (MCF), etc. Results from the one or more authentication measures 141 can be provided as feedback to the risk engine 131. Additionally, such results are analyzed so as to determine if the one or more authentication measures have been passed or failed in step 142. If the authentication measures have been successfully passed, the processing of the query continues in step 134. If the authentication measures have been failed, a corresponding case is created in a case management database 143, and the updated case management database 143 is provided as feedback to the risk engine 131.

Figure 2:
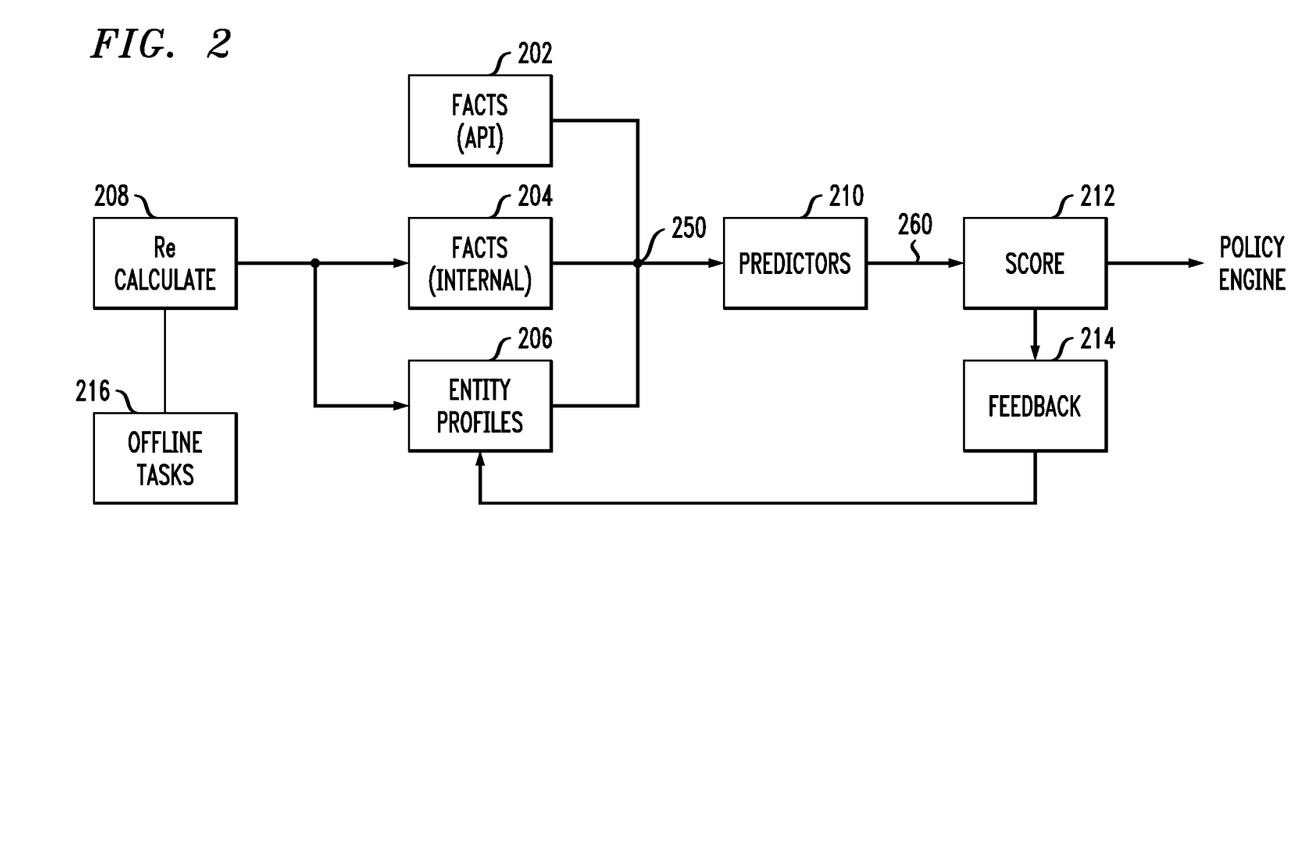
FIG. 2 is a diagram illustrating components of an example embodiment of the present invention.

FIG. 2 is a diagram illustrating an example embodiment of the present invention. Specifically, FIG. 2 depicts steps and components implemented within risk engine 131 (as depicted in FIG. 1) in accordance with one or more embodiments of the invention. By way of illustration, FIG. 2 depicts a component 202 storing a set of facts obtained via an application programming interface (API), a component 204 storing a set of stored internal facts, a component 206 storing entity profiles, and a component 210 storing a set of predictors. By way of example, facts obtained and/or received via an API might include account information, internet protocol (IP) address, device information, location information, etc. Internal facts can include items of information that were not received through the API, such as, for example, the geo-location of an IP address or the last time the user logged-in to the system.

As used herein, predictors include facts and/or a combination of facts associated with a risk contribution. For example, an IP address is a fact. If a particular IP address is white-listed, it can be utilized as a valuable predictor, and if the IP address is associated with a known fraudster, it contributes to high risk. Other predictors may include compounds such as, for example, a device identifier (ID) combined with the time of last log-in, creating an association of a user to the device or device age in the system (new devices and a new device for a particular user might be considered riskier).

Accordingly, in response to a submitted query, a data store (for example, a relational database management system (RDBMS)) can be accessed to retrieve internal facts (via component 204) and various entity profiles (via component 206) such as the profile of the IP address from which the query originated, the account from which the query originated, and any relations required to fetch an appropriate set of predictors (via component 210) needed to calculate a score 212.

At least one embodiment of the invention includes fetching an entire profile from component 206 within size limitations (for example, within a cache limit of one terabyte (TB)). Therefore, in at least one embodiment of the invention, DB tuning includes reducing IP block flow, wherein it is ensured that the relevant profile is on as few DB blocks as possible. This can be carried out differently per DB. For example, some DBs may need a definition of block size, some DBs may need the order in the index, while other DBs may need to define a table in a specific way. However, in scenarios where, for example, there are a significant number of profiles in the system such as to support mobile and user behavior, it can become challenging to put an entire profile on a limited number of input/output (I/O) blocks. Further, it would be advantageous to support various databases that each encompasses different memory usage, while nonetheless performing executions of queries efficiently.

Note also, that in many existing approaches incorporating RDBMS systems, when a varying number of fields is provided to a user as a result of a query (such as, for example, carrying out a "select name and address from T1" query instead of a "select * from T1" query in a table with name, address and identifier (ID) columns), different results may not be provided for a narrower query, and the process may in fact execute more slowly in some instances.

Accordingly, and because data can be modeled into a net-like graph or map in a database (for example, entity profile elements are commonly related and can be formed into a tree or a net), at least one embodiment of the invention includes determining certain cut-off points for the data. Cut-off points can be determined by grouping data. By way of example, a cut-off point can be determined by grouping all data points associated with an IP address on a single data block. The data (that is, any piece of data in the use entity profile or matching processing rules) can then be distributed on I/O blocks based on that map. As such, each API fact (obtained via component 202) is processed via a Rete process, which tags or otherwise identifies only those facts that are required to be calculated in the given query or transaction, and also identifies the one or more data access policies that match the given query use case. Additionally, such data access policies are stored in a data cache for processing rules.

Additionally, at least one embodiment of the invention also includes obtaining and/or intercepting the given query, which may have been generated originally by a developer, and tuning the query to fetch the minimal number of I/O calls. One or more embodiments of the invention can also include computing a path of the model to approximate or estimate what might occur if relevant data is not fetched (for instance, if the relevant data is stale and not to be used), and further trimming the access tree in conjunction with that computed path. Further, the process noted above can be repeated based on actual fetched data so as to prevent further access if the data is not present in the next query in a given timeframe, thus re-writing the rules that compose the model for performance and/or accuracy. For example, if the transaction is not of a payment type, there is no need to fetch payment related information. As another example, if the device in question is a new device, user device history is not required. Also, if an indication of a high-risk IP address or device is determined, there is may be no need in fetching other items of data, as this indication of high-risk will override other processing.

Referring back to FIG. 2, in at least one embodiment of the invention, dynamic user information is obtained via component 202. In obtaining such information, one or more embodiments of the invention include building individual user patterns as well as user population patterns based on the dynamic user information. In addition to the dynamic user information, a user query can be obtained (for example, via an API) via component 202 as well.

Additionally, in at least one embodiment of the invention, static storage device information is obtained and stored in component 204. Information (also noted herein as internal facts) contained within component 204 includes information pertaining to how data is stored on a specific storage device, as well as how data is processed by the specific storage device. As detailed herein, at least one embodiment of the invention can be implemented in connection with an in-memory database and/or a storage device in lieu of a data store. Such information (that is, the information contained within component 204) differs across storage devices as well as across entities, and significant and/or sizeable rule sets can be created based on this information. Further, in at least one embodiment of the invention, the Rete algorithm is used to map the information in these created rule sets. As would be appreciated by one skilled in the art, the Rete algorithm can be utilized to match data (such as facts) with one or more rules in accordance with a rule engine or analogous pattern-matching system.

Further, at least one embodiment of the invention includes obtaining and storing entity profiles via component 206. Such entity profiles can include, for example, information identifying known or established levels of risk associated with particular IP addresses and/or users, black lists, white lists, etc. Such information can be learned and/or determined over time.

As depicted in FIG. 2, dynamic user information including a user query (via component 202), static storage device information (via component 204) and one or more relevant entity profiles (via component 206) are merged in step 250 and used to automatically determine and generate a re-written form of the user query, wherein the re-written form of the query more efficiently targets one or more data blocks from which to fetch data in responding to the query without limiting the amount of potentially related information returned in responding to the query. Specifically, at least one embodiment of the invention includes basing such a determination on the merged information obtained from components 202, 204 and 206. By way of illustration, consider the following example.

Via component 202, a user query is obtained. In addition to the query itself, component 202 additionally obtains user information such as, for example, the IP address of the user submitting the query. Also, component 204 can contain rules sets as to how data is stored on this given storage device (that is, the storage device upon which the query has been submitted) and how data is processed on this given storage device, such as how data blocks are arranged and/or indexed, etc. Additionally, component 206 might include, as noted above, information pertaining to established risk levels associated with, for example, particular IP addresses.

Accordingly, in this example, step 250 (as depicted in FIG. 2) might include identifying a subject matter area or content topic in the submitted user query (via component 202) (which can be carried out, for example, by the first run of the rule set), and comparing that information to the rule sets contained in component 204 to determine which of one or more data blocks in the storage device may potentially hold information and/or data relevant to that subject matter area or content topic, as well as to determine how to efficiently access those one or more data blocks in the storage device. Such determinations, accordingly, can be used to automatically tailor or re-write the originally-submitted user query so as to facilitate a more efficient processing of the query by the given storage device. By way of example, an original query might contain a superset of all relevant fields (for instance, over a 100), and the subset (or re-written query) will be tuned to the IO or net flow of the system. As such, "select * from $T_1$, where id=userid" would become "Select $a_1$ $s_2$ $d_3$ from $T_1$, where id=userid hint 1, hint 2 . . . ."

Further, in this example, the IP address of the user submitting the query (obtained via component 202) can be compared to information contained in the entity profiles component 206 pertaining to established risk levels associated with IP addresses, and the risk level corresponding to the IP address of the user submitting the query can be identified and included as part of the re-written query.

In such an example, and as illustrated in FIG. 2, the re-written query (determined and generated via step 250) is output and/or provided to predictors component 210 so as to identify and fetch the appropriate set of predictors needed to calculate a risk score 212 to be associated with the re-written query in step 260. Predictors, by way of example, are utilized to examine information such as compiled in step 250 and determine whether such information corresponds to historical use cases and/or established policy parameters, so as to ultimately calculate a risk score 212 in step 260 based on this information. As noted herein, predictors include an association of a fact or a set of facts with a risk score. For example, a high risk level associated with the IP address of the user submitting the query (as incorporated into the re-written query) may cause one set of predictors to be identified and fetched, resulting in a particular risk score, while a low risk level associated with the IP address of the user submitting the query may cause a different set of predictors to be identified and fetched, resulting in a different (and potentially lower) risk score to be associated with the query.

By way of illustration, calculating a risk score in step 260 can be carried out as follows. For example, a risk score (for instance, a value between 0 and 1000) associated with the re-written query indicates an amount of risk based on a comparison between stored attributes (or behavior information) from predictors 210 and received attributes (or behavior information) associated with the re-written query. At least one embodiment of the invention includes operating parameters such as, for example, a pre-defined threshold so that a query risk score above the threshold indicates a likely fraudster situation while a query risk score below the threshold indicates an unlikely fraudster situation. In one or more embodiments of the invention, the risk score is an aggregation of individual weight risk analysis results from comparisons of individual factors (for example, device address, internet service provider (ISP) address, geographic location, tracking cookie information, time of day, etc.).

Additionally, in at least one embodiment of the invention, the calculated risk score 212 is output and/or provided to a policy engine associated with storage device upon which the user query was submitted. The policy engine can then utilize the risk score to make subsequent policy determinations regarding the processing of the query. For example, assume that the given storage device is a bank database. Upon receiving the calculated risk score, the bank's policy engine may determine that a query possessing such a risk score requires that additional security questions be asked of the user (that is, the user submitting the query) prior to advancing to the stage of actually processing the query. Or, alternatively, the bank's policy engine may determine that a query possessing such a risk score requires that the user utilize a security token prior to advancing to the stage of actually processing the query. Further, the bank's policy engine may determine that a query possessing that calculated risk score can be blocked from being processed, or can be permitted for immediate processing (full or partial).

Also, in accordance with at least one embodiment of the invention, a feedback component 214 (such as illustrated in FIG. 1) can be incorporated into the system depicted in FIG. 2, as well as one or more offline tasks 216 that correspond to a re-calculation component 208. Such aspects are further detailed herein.

Figure 3:
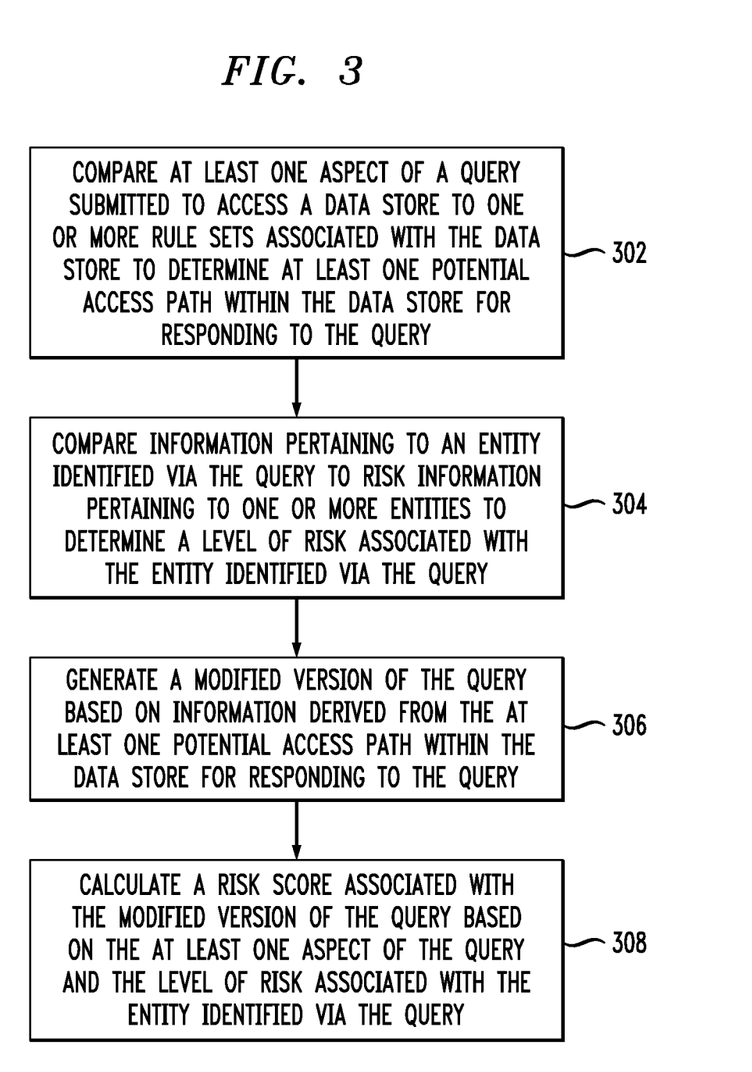
FIG. 3 is a flow diagram illustrating techniques according to an embodiment of the invention.

FIG. 3 is a flow diagram illustrating techniques according to an embodiment of the present invention. Step 302 includes comparing at least one aspect of a query submitted to access a data store to one or more rule sets associated with the data store to determine at least one potential access path within the data store for responding to the query. An aspect of the query can include, for example, a subject matter area of the query and/or a content topic in the query. Additionally, at least one embodiment of the invention includes determining the at least one aspect of the query.

Also, rule sets associated with the data store can include one or more rule sets identifying which of one or more data blocks in the data store maintain information and/or data relevant to the at least one aspect of the query. Further, rule sets associated with the data store can include one or more rule sets pertaining to accessing one or more data blocks in the data store. Additionally, at least one embodiment of the invention includes obtaining information pertaining to the rule sets associated with the data store, wherein such information can include information pertaining to how data is stored on the data store, and information pertaining to how data is processed by the data store.

Step 304 includes comparing information pertaining to an entity identified via the query (as derived by the risk engine, for example) to risk information pertaining to one or more entities (for example, via one or more entity profiles) to determine a level of risk associated with the entity identified via the query. As detailed herein, information pertaining to an entity identified via the query can include an internet protocol (IP) address of the entity and/or an account identifier of the entity. Further, risk information pertaining to one or more entities can include established risk levels associated with one or more IP addresses and/or one or more account identifiers. Also, entity profiles (which include risk information pertaining to one or more entities) can be obtained and stored.

Additionally, at least one embodiment of the invention includes obtaining information pertaining to the entity identified via the query. Further, at least one embodiment of the invention can also include building a pattern of behavior for the entity identified via the query based on the information pertaining to the entity, as well as building a pattern of behavior for a population of entities based on the information pertaining to the entity identified via the query in conjunction with stored information pertaining to one or more additional entities.

Step 306 includes generating a modified version of the query based on information derived from the at least one potential access path within the data store for responding to the query. As described herein, the modified version of the query targets one or more data blocks from which to fetch data in responding to the query, and also identifies a minimal number of input/output calls required in responding to the query.

Step 308 includes calculating a risk score associated with the modified version of the query based on the at least one aspect of the query and the level of risk associated with the entity identified via the query. Calculating a risk score can include, for example, determining whether the at least one aspect of the query and the level of risk associated with the entity identified via the query correspond to historical use cases and/or policy parameters.

The techniques depicted in FIG. 3 can additionally include outputting the risk score associated with the modified version of the query to a policy engine associated with the data store. Further, at least one embodiment of the invention can include incorporating feedback directed to the modified version of the query and/or the risk score associated with the modified version of the query.

Also, in accordance with at least one embodiment of the invention, the techniques of FIG. 3 can be implemented in connection with an in-memory database in the place of a data store. Further, in accordance with at least one embodiment of the invention, the techniques of FIG. 3 can be implemented in connection with a storage device in the place of a data store.

Figure 4:
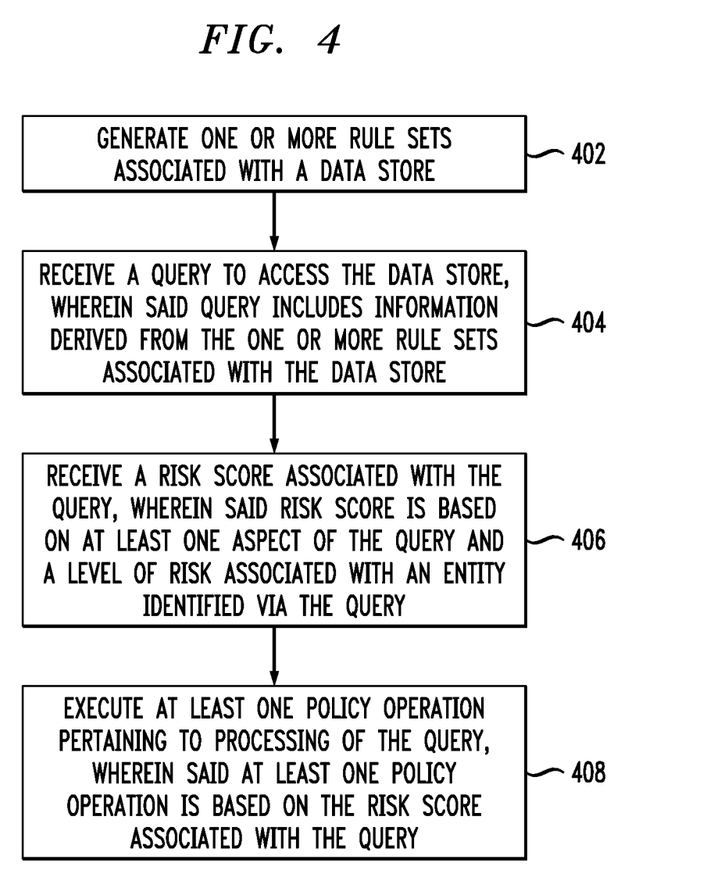
FIG. 4 is a flow diagram illustrating techniques according to an embodiment of the invention.

FIG. 4 is a flow diagram illustrating techniques according to an embodiment of the present invention. Step 402 includes generating one or more rule sets associated with a data store. Step 404 includes receiving a query to access the data store, wherein said query includes information derived from the one or more rule sets associated with the data store. Step 406 includes receiving a risk score associated with the query, wherein said risk score is based on at least one aspect of the query and a level of risk associated with an entity identified via the query. Step 408 includes executing at least one policy operation pertaining to processing of the query, wherein said at least one policy operation is based on the risk score associated with the query.

Also, in accordance with at least one embodiment of the invention, the techniques of FIG. 4 can be implemented in connection with an in-memory database in the place of a data store. Further, in accordance with at least one embodiment of the invention, the techniques of FIG. 4 can be implemented in connection with a storage device in the place of a data store.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and configured to perform the techniques detailed herein. Also, as described herein, aspects of the present invention may take the form of a computer program product embodied in a computer readable medium having computer readable program code embodied thereon.

Figure 5:
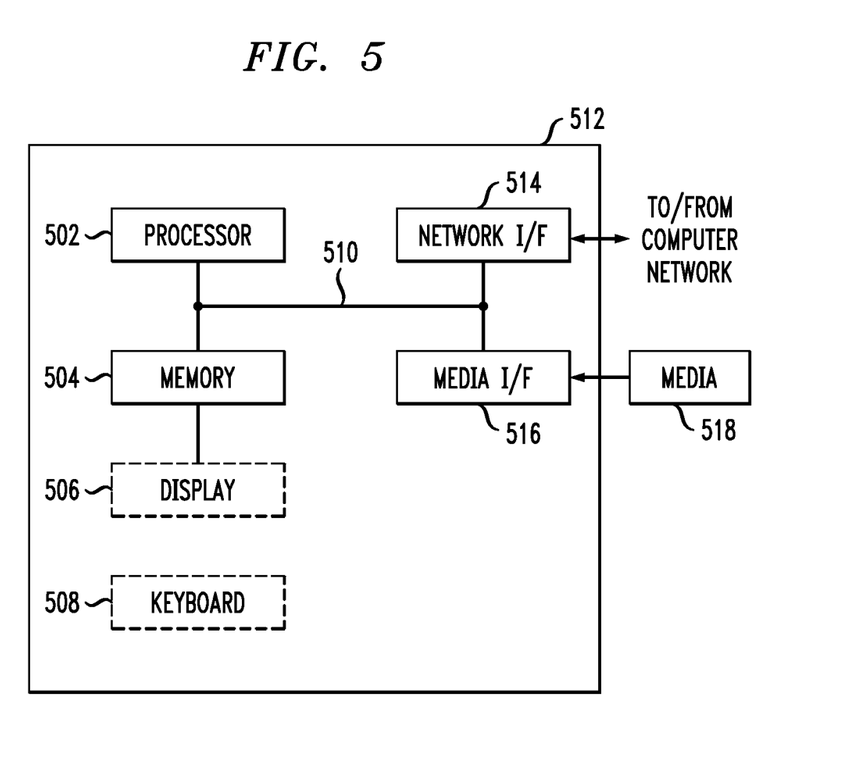
FIG. 5 is a system diagram of an exemplary computer system on which at least one embodiment of the invention can be implemented.

By way of example, an aspect of the present invention can make use of software running on a general purpose computer. As noted above, FIG. 5 is a system diagram of an exemplary computer system on which at least one embodiment of the invention can be implemented. As depicted in FIG. 5, an example implementation employs, for example, a processor 502, a memory 504, and an input/output interface formed, for example, by a display 506 and a keyboard 508. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 502, memory 504, and input/output interface such as display 506 and keyboard 508 can be interconnected, for example, via bus 510 as part of a data processing unit 512. Suitable interconnections via bus 510, can also be provided to a network interface 514 (such as a network card), which can be provided to interface with a computer network, and to a media interface 516 (such as a diskette or compact disc read-only memory (CD-ROM) drive), which can be provided to interface with media 518.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 508, displays 506, and pointing devices, can be coupled to the system either directly (such as via bus 510) or through intervening I/O controllers.

Network adapters such as network interface 514 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 512 as depicted in FIG. 5) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), Flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and cryptographic devices that can benefit from the risk calculation techniques detailed herein. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
   comparing at least one aspect of a query to access a data store to one or more rule sets associated with the data store to determine at least one potential access path within the data store for responding to the query, wherein said comparing the at least one aspect is carried out prior to executing said query on the data store;
   comparing information pertaining to an entity responsible for submission of the query to risk information pertaining to one or more entities to determine a level of risk associated with the entity, wherein said risk information comprises an established risk level attributed to (i) one or more internet protocol addresses pertaining to the one or more entities and (ii) one or more account identifiers pertaining to the one or more entities, wherein said comparing comprises comparing the one or more internet protocol addresses pertaining to the one or more entities to (a) a white list of internet protocol addresses and (b) a list of internet protocol addresses linked to fraudulent activity, and wherein said comparing the information is carried out prior to executing said query on the data store;
   generating a modified version of the query based on information derived from the at least one potential access path within the data store for responding to the query, wherein said generating comprises re-formatting one or more Rete-based rules to reduce response data resulting from the query, and wherein said generating the modified version of the query is carried out prior to executing said query on the data store;
   calculating a risk score associated with the modified version of the query based on (i) the level of risk associated with the entity responsible for submission of the query, (ii) one or more aspects of the modified version of the query, and (iii) a correlation between the level of risk associated with the entity and at least one of one or more historical use cases and one or more policy parameters, wherein said calculating is carried out prior to executing said modified version of the query on the data store;
   determining, based on the risk score, one or more of multiple authentication operations to be implemented prior to executing the modified version of the query on the data store; and
   implementing the one or more authentication operations prior to executing the modified version of the query on the data store.

2. The method of claim 1, wherein said at least one aspect of the query comprises at least one of a subject matter area of the query and a content topic in the query.

3. The method of claim 1, further comprising:
   determining the at least one aspect of the query.

4. The method of claim 1, wherein said one or more rule sets associated with the data store comprise one or more rule sets identifying which of one or more data blocks in the data store maintain information relevant to the at least one aspect of the query.

5. The method of claim 1, wherein said one or more rule sets associated with the data store comprise one or more rule sets pertaining to accessing one or more data blocks in the data store.

6. The method of claim 1, wherein said information pertaining to an entity responsible for submission of the query comprises at least one of an internet protocol address of the entity and an account identifier of the entity.

7. The method of claim 1, wherein said modified version of the query targets one or more data blocks from which to fetch data in responding to the modified version of the query.

8. The method of claim 1, wherein said modified version of the query identifies a minimal number of input/output calls required in responding to the modified version of the query.

9. The method of claim 1, further comprising:
obtaining information pertaining to the entity responsible for submission of the query;
building a pattern of behavior for the entity responsible for submission of the query based on the information pertaining to the entity responsible for submission of the query; and
building a pattern of behavior for a population of entities based on the information pertaining to the entity responsible for submission of the query in conjunction with stored information pertaining to one or more additional entities.

10. The method of claim 1, further comprising:
obtaining information pertaining to the one or more rule sets associated with the data store, wherein said information pertaining to the one or more rule sets associated with the data store comprises at least one of information pertaining to how data is stored on the data store, and information pertaining to how data is processed by the data store.

11. The method of claim 1, further comprising:
outputting the risk score associated with the modified version of the query to a policy engine associated with the data store.

12. The method of claim 1, further comprising:
incorporating feedback directed to the modified version of the query.

13. An article of manufacture comprising a processor-readable storage medium having processor-readable instructions tangibly embodied thereon which, when implemented, cause a processor to carry out the steps of the method of claim 1.

14. The method of claim 1, further comprising:
incorporating feedback directed to the risk score associated with the modified version of the query.

15. A method comprising:
comparing at least one aspect of a query to access an in-memory database to one or more rule sets associated with the in-memory database to determine at least one potential access path within the in-memory database for responding to the query, wherein said comparing the at least one aspect is carried out prior to executing said query on the in-memory database;
comparing information pertaining to an entity responsible for submission of the query to risk information pertaining to one or more entities to determine a level of risk associated with the entity, wherein said risk information comprises an established risk level attributed to (i) one or more internet protocol addresses pertaining to the one or more entities and (ii) one or more account identifiers pertaining to the one or more entities, wherein said comparing comprises comparing the one or more internet protocol addresses pertaining to the one or more entities to (a) a white list of internet protocol addresses and (b) a list of internet protocol addresses linked to fraudulent activity, and wherein said comparing the information is carried out prior to executing said query on the in-memory database;
generating a modified version of the query based on information derived from the at least one potential access path within the in-memory database for responding to the query, wherein said generating comprises re-formatting one or more Rete-based rules to reduce response data resulting from the query, and wherein said generating the modified version of the query is carried out prior to executing said query on the in-memory database;
calculating a risk score associated with the modified version of the query based on (i) the level of risk associated with the entity responsible for submission of the query, (ii) one or more aspects of the modified version of the query, and (iii) a correlation between the level of risk associated with the entity and at least one of one or more historical use cases and one or more policy parameters, wherein said calculating is carried out prior to executing said query on the in-memory database;
determining, based on the risk score, one or more of multiple authentication operations to be implemented prior to executing the modified version of the query on the in-memory database; and
implementing the one or more authentication operations prior to executing the modified version of the query on the in-memory database.

16. The method of claim 15, further comprising:
incorporating feedback directed to the risk score associated with the modified version of the query.

17. A method comprising:
comparing at least one aspect of a query to access a storage device to one or more rule sets associated with the storage device to determine at least one potential access path within the storage device for responding to the query, wherein said comparing the at least one aspect is carried out prior to executing said query on the storage device;
comparing information pertaining to an entity responsible for submission of the query to risk information pertaining to one or more entities to determine a level of risk associated with the entity, wherein said risk information comprises an established risk level attributed to (i) one or more internet protocol addresses pertaining to the one or more entities and (ii) one or more account identifiers pertaining to the one or more entities, wherein said comparing comprises comparing the one or more internet protocol addresses pertaining to the one or more entities to (a) a white list of internet protocol addresses and (b) a list of internet protocol addresses linked to fraudulent activity, and wherein said comparing the information is carried out prior to executing said query on the storage device;
generating a modified version of the query based on information derived from the at least one potential access path within the storage device for responding to the query, wherein said generating comprises re-formatting one or more Rete-based rules to reduce response data resulting from the query, and wherein said generating the modified version of the query is carried out prior to executing said query on the storage device;
calculating a risk score associated with the modified version of the query based on (i) the level of risk associated with the entity responsible for submission of the query, (ii) one or more aspects of the modified version of the query, and (iii) a correlation between the level of risk associated with the entity and at least one of one or more historical use cases and one or more policy parameters, wherein said calculating is carried out prior to executing said query on the storage device;

determining, based on the risk score, one or more of multiple authentication operations to be implemented prior to executing the modified version of the query on the storage device; and implementing the one or more authentication operations prior to executing the modified version of the query on the storage device.

18. The method of claim 17, further comprising:

incorporating feedback directed to the risk score associated with the modified version of the query.

19. An apparatus comprising:

a memory; and at least one processor coupled to the memory and configured to:

compare at least one aspect of a query to access a data store to one or more rule sets associated with the data store to determine at least one potential access path within the data store for responding to the query, wherein said comparing the at least one aspect is carried out prior to executing said query on the data store;

compare information pertaining to an entity responsible for submission of the query to risk information pertaining to one or more entities to determine a level of risk associated with the entity, wherein said risk information comprises an established risk level attributed to (i) one or more internet protocol addresses pertaining to the one or more entities and (ii) one or more account identifiers pertaining to the one or more entities, wherein said comparing comprises comparing the one or more internet protocol addresses pertaining to the one or more entities to (a) a white list of internet protocol addresses and (b) a list of internet protocol addresses linked to fraudulent activity, and wherein said comparing the information is carried out prior to executing said query on the data store;

generate a modified version of the query based on information derived from the at least one potential access path within the data store for responding to the query, wherein said generating comprises re-formatting one or more Rete-based rules to reduce response data resulting from the query, and wherein said generating the modified version of the query is carried out prior to executing said query on the data store;

calculate a risk score associated with the modified version of the query based on (i) the level of risk associated with the entity responsible for submission of the query, (ii) one or more aspects of the modified version of the query, and (iii) a correlation between the level of risk associated with the entity and at least one of one or more historical use cases and one or more policy parameters, wherein said calculating is carried out prior to executing said modified version of the query on the data store;

determine, based on the risk score, one or more of multiple authentication operations to be implemented prior to executing the modified version of the query on the data store; and implement the one or more authentication operations prior to executing the modified version of the query on the data store.

\* \* \* \* \*